United States Patent
Haeberer

(10) Patent No.: US 9,745,880 B2
(45) Date of Patent: Aug. 29, 2017

(54) COOLING ELEMENT FOR INJECTION VALVE

(71) Applicant: Robert Bosch GmbH, Stuttgart (DE)

(72) Inventor: Rainer Haeberer, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/898,947

(22) PCT Filed: Apr. 22, 2014

(86) PCT No.: PCT/EP2014/058112
§ 371 (c)(1),
(2) Date: Dec. 16, 2015

(87) PCT Pub. No.: WO2014/202259
PCT Pub. Date: Dec. 24, 2014

(65) Prior Publication Data
US 2016/0369679 A1   Dec. 22, 2016

(30) Foreign Application Priority Data
Jun. 20, 2013   (DE) .................. 10 2013 211 684

(51) Int. Cl.
*F01N 3/00* (2006.01)
*F01N 3/28* (2006.01)
(Continued)

(52) U.S. Cl.
CPC ............... *F01N 3/28* (2013.01); *F01N 3/206* (2013.01); *F01N 3/2066* (2013.01);
(Continued)

(58) Field of Classification Search
USPC .................. 60/286, 295, 298, 301, 303, 320; 239/128, 132, 132.1, 132.2, 132.5
See application file for complete search history.

(56) References Cited

U.S. PATENT DOCUMENTS

| 5,605,042 A * | 2/1997 | Stutzenberger .... B01D 53/9431 60/286 |
| 6,279,603 B1 * | 8/2001 | Czarnik ............. B01D 53/8625 123/472 |

(Continued)

FOREIGN PATENT DOCUMENTS

| CH | 152348 | 1/1932 |
| DE | 102009027181 | 12/2010 |

(Continued)

OTHER PUBLICATIONS

International Search Report for Application No. PCT/EP2014/058112 dated Jul. 21, 2014 (English Translation, 2 pages).

*Primary Examiner* — Binh Q Tran
(74) *Attorney, Agent, or Firm* — Michael Best & Friedrich LLP

(57) ABSTRACT

The invention relates to a cooling element (38; 40) for an injection valve (1; 41), in particular for injecting a liquid reduction agent into an exhaust train of a combustion engine, having a hollow region for receiving a section of the injection valve (1; 41) and a cooling plate (8) which is circumferential around the hollow region and a face plate (7) arranged on a face of the injection valve (1; 41) which has at least one injection opening (13), which enables the spraying of liquid out of the injection valve (1; 41) through the face plate (7). The face plate (7) has at least one bowl-shaped region (7a) formed having a front wall and at least one side wall which is designed to receive an injection-side section (1a; 41a) of the injection valve (1; 41), and the cooling plate (8) and the face plate (7) are connected to each other in a liquid-tight manner such that, in a state in which a section of an injection valve (1; 41) is properly arranged in the hollow region, a cooling volume (36) circulating around the section of the injection valve (1; 41) is delimited (Continued)

by the face plate (7), the cooling plate (8) and the injection valve (1; 41).

18 Claims, 3 Drawing Sheets

(51) Int. Cl.
*F01N 3/20* (2006.01)
*F02M 53/04* (2006.01)

(52) U.S. Cl.
CPC ..... *F02M 53/043* (2013.01); *F01N 2260/024* (2013.01); *F01N 2610/02* (2013.01); *F01N 2610/11* (2013.01); *F01N 2610/1453* (2013.01); *Y02T 10/24* (2013.01)

(56) References Cited

U.S. PATENT DOCUMENTS

| | | | | |
|---|---|---|---|---|
| 6,513,323 B1* | 2/2003 | Weigl | ............... | B01D 53/9431 |
| | | | | 137/340 |
| 6,539,708 B1* | 4/2003 | Hofmann | ........... | B01D 53/8631 |
| | | | | 239/132.3 |
| 7,603,849 B2* | 10/2009 | Hanitzsch | ............. | F01N 3/2066 |
| | | | | 239/128 |
| 9,488,292 B2* | 11/2016 | Winkler | ................ | F01N 3/2066 |

FOREIGN PATENT DOCUMENTS

| | | |
|---|---|---|
| DE | 102010048284 | 4/2012 |
| DE | 102010051656 | 5/2012 |
| DE | 102011078504 | 1/2013 |

\* cited by examiner

COOLING ELEMENT FOR INJECTION VALVE

BACKGROUND OF THE INVENTION

The invention relates to a cooling element for an injection valve, in particular for an injection valve which is provided for injecting a liquid reducing agent into an exhaust gas section of an internal combustion engine. Moreover, the invention also relates to an injection valve which is connected to a cooling element of this type.

In motor vehicles having internal combustion engines, in particular diesel engines, the pollutant $NO_x$, inter alia, has to be reduced on account of the tightened exhaust gas legislation. One method which is frequently used here is what is known as the SCR method, in which the pollutant $NO_x$ is reduced to $N_2$ and $H_2O$ using a liquid reducing agent.

To this end, the liquid reducing agent is removed from a tank, is delivered by a delivery pump to an injection module which is arranged on an exhaust gas section of the internal combustion engine, and is injected by the injection module in a metered manner into the exhaust gas section, where it mixes with the exhaust gases of the internal combustion engine which flow through the exhaust gas section. Since the injection module is subjected to the high temperatures of the exhaust gases which flow through the exhaust gas section, a cooling water-based cooling means is usually provided, in order to limit the temperature of the injection module and thus to avoid overheating of the injection module.

DE 10 2010 051 656 A1 and DE 10 2010 048 284 A1 in each case disclose an arrangement for cooling the injection module. In the arrangements which are disclosed there, the cooling adapter is a separate component which is welded together from two sheet metal parts which form an annular duct which is connected via two adhesive connections to a shank region of the metering valve.

SUMMARY OF THE INVENTION

It is an object of the invention to provide an improved cooling element for an injection module, which cooling element is, in particular, simple to manufacture and which seals the cooling volume reliably and permanently even at high temperatures, as occur, for example, during operation of an internal combustion engine and during mounting by way of brazing or welding.

A cooling element according to the invention for an injection valve which is provided, in particular, for injecting a liquid reducing agent into an exhaust gas section of an internal combustion engine has a hollow region which is provided for receiving a section of the injection valve, a cooling plate which runs around said hollow region, and an end plate which is arranged on an end side of the hollow region. The cooling plate and the end plate are connected to one another in a fluid-tight manner, with the result that, in a state in which an injection-side section of an injection valve is arranged as intended in the hollow region, the end plate, the cooling plate and the injection valve together delimit a cooling volume which runs around the injection-side section of the injection valve. Here, the end plate has at least one region which is shaped in a bowl-like manner, has an end wall and at least one side wall and is configured for receiving the injection-side section of the injection valve. At least one injection opening is provided in that region of the end plate which is of bowl-like configuration, which injection opening makes it possible to inject fluid through the end plate out of the injection valve into the exhaust gas section of the internal combustion engine.

The invention also comprises an injection apparatus having an injection valve, which is configured, in particular, for injecting a fluid reducing agent into an exhaust gas section of an internal combustion engine, and a cooling element according to the invention, as has been described above. Here, an injection-side section of the injection valve is arranged in the bowl-like region of the end plate of the cooling element, in particular in such a way that it is in contact with the end side and at least one side wall of the bowl-like region.

As a result of the bowl-like region which is configured in the end plate, it is possible to provide a positively locking connection between the injection valve and the end plate, for example by way of (laser) welding, which positively locking connection can be of fluid-tight configuration even at high temperatures, as occur, in particular, during the operation of an internal combustion engine at its exhaust gas section. In particular, heat-sensitive adhesive connections and/or O-rings can be dispensed with according to the invention in said high-temperature region. A cooling element is therefore provided which permanently provides a satisfactorily sealed cooling volume even at high operating temperatures and which can be manufactured simply and inexpensively on account of fewer joins.

Since, in particular, the front, injection-side section of the injection valve is as a rule of cylindrical configuration, the bowl-like region which is provided for receiving the front, injection-side section of the injection valve is also as a rule of rotationally symmetrical configuration about the longitudinal axis of the cylindrical section of the injection valve with a circular end side and a side wall which runs along the circumference of the circular end side. However, the shape of the bowl-like region can also be adapted to other possible valve shapes, for example injection valves which have an elliptical or rectangular cross section, without deviating from the basic concept of the invention.

In one possible embodiment, the cooling plate and the end plate are connected to one another in a fluid-tight manner by way of welding, in particular laser welding. Since both the cooling plate and the end plate are configured from heat-resistant metal, a permanently reliably sealing connection between the cooling plate and the end plate can be produced inexpensively by way of welding, in particular laser welding.

In one embodiment, the cooling element additionally has a connector piece which is configured for receiving a rear end region of the injection valve, which rear end region lies opposite the injection-side section. A connector piece of this type makes it possible to enclose the injection valve completely in the cooling element and in this way to protect it against damaging environmental influences. The connector piece is preferably configured in such a way that it contains, receives and/or supports a feed line which is configured to feed the fluid to be injected to the injection valve.

In one embodiment, at least one feed stub and/or one outlet stub is provided on the cooling plate of the cooling element, which feed stub and/or outlet stub is configured to conduct a cooling fluid into and out of the cooling volume, respectively. In this way, a cooling fluid can be introduced reliably into the cooling volume and can be discharged from the latter again.

In one embodiment, the connector piece is configured in such a way that it can be mounted on the feed stub and/or on the outlet stub. The feed stub and the outlet stub provide satisfactory and stable fastening possibilities for the connector piece. In particular, the manufacture of an additional fastening possibility for the connector piece can be dispensed with in this way, as a result of which the manufacturing costs for the cooling element can be kept low.

In one embodiment, at least one region of the cooling plate bears against the injection valve, and the cooling volume is sealed in a fluid-tight manner by way of at least one O-ring which is arranged between the injection valve and the cooling plate. In this way, structurally simple but reliable sealing of the cooling volume is provided.

In an alternative embodiment, the injection valve has at least two metal sleeves which are arranged coaxially with respect to one another and are connected to one another in a fluid-tight manner by way of welding, in particular laser welding, in order to provide a fluid-tight connection between the two metal sleeves. In this way, a cooling volume which is sealed in a fluid-tight manner can be provided without using an O-ring.

BRIEF DESCRIPTION OF THE DRAWINGS

The invention will be explained in greater detail in the following text with reference to the appended figures.

DETAILED DESCRIPTION

Figure 1:
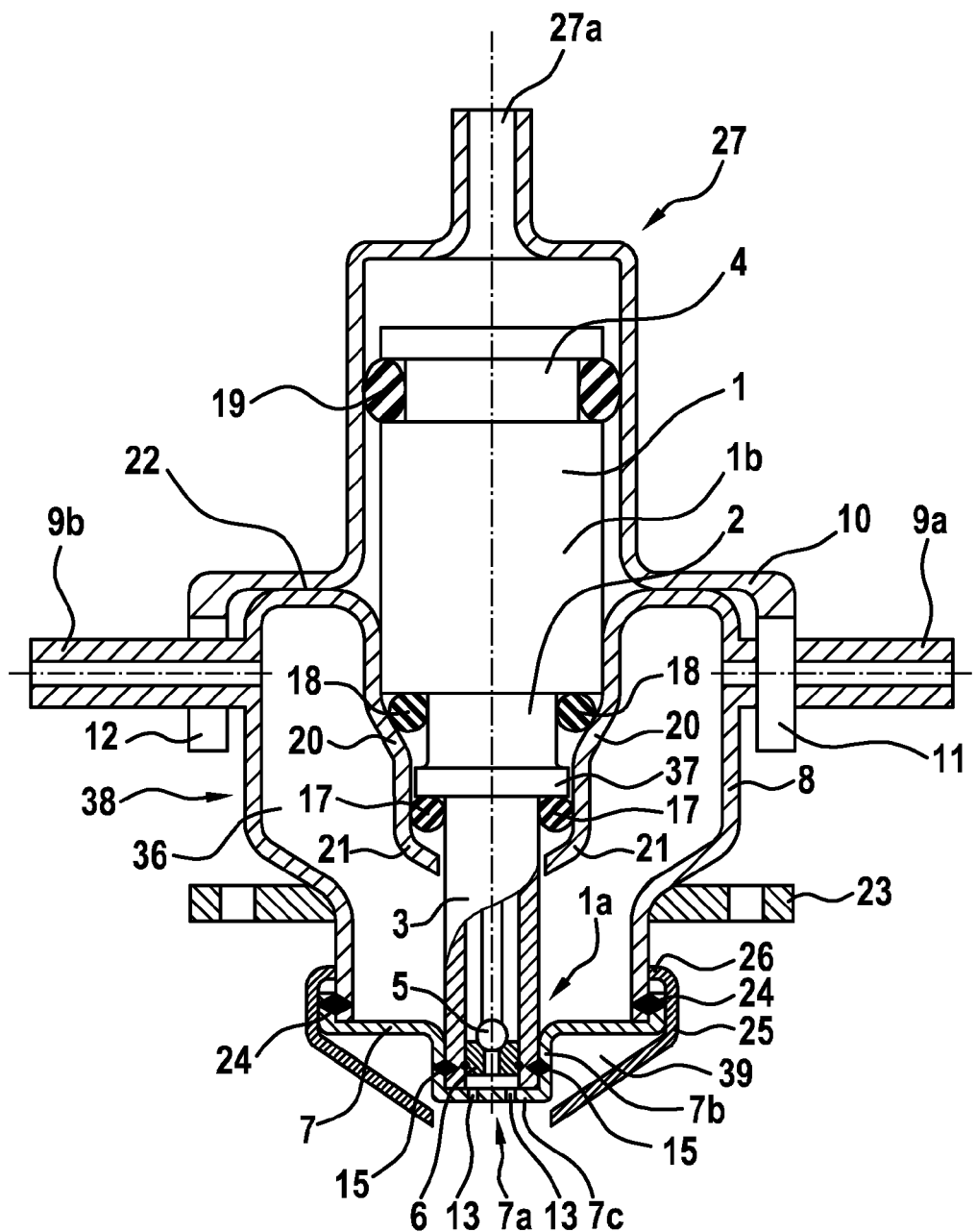
FIG. 1 shows a sectional view of a first exemplary embodiment of a cooling element according to the invention having an injection valve.
Figure 2:
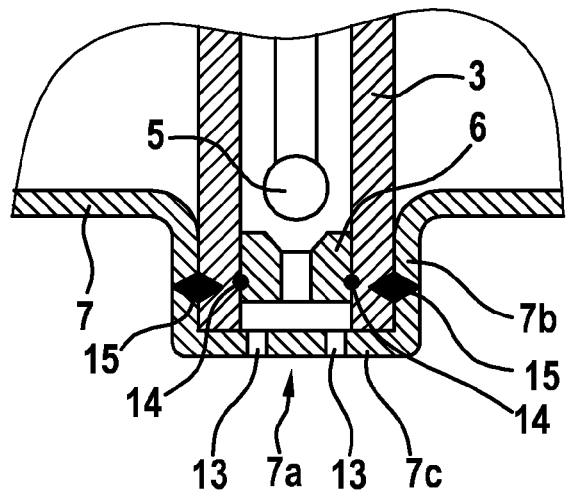
FIG. 2 shows an enlarged detail from FIG. 1 which shows the region around the valve tip of the injection valve.

FIG. 1 shows a sectional view of a first exemplary embodiment of a cooling element 38 according to the invention having an injection valve 1, and FIG. 2 shows an enlarged detail from FIG. 1 which shows the region around the tip 1a of the injection valve 1.

The injection valve 1 which is shown in FIGS. 1 and 2 has an injection-side sleeve 3, into which a valve seat 6 is welded by means of a circumferential (laser) weld 14. The valve seat 6 can be selectively closed and opened by way of a valve closure element 5 which is mounted movably in the sleeve 3 of the injection valve 1, in order for it to be possible to inject fluid in a controlled manner from the injection valve 1 into an exhaust gas section (not shown in FIG. 1).

A cooling element 38 according to the invention comprises a cooling plate 8 which is curved in a U-shaped manner and to which an end plate 7 is connected in a fluid-tight manner, for example by way of a circumferential (laser) weld 24. The end plate 7 is of bowl-like configuration in the region around the tip 1a of the injection valve 1 in such a way that the tip 1a of the injection valve 1 can be introduced in a substantially positively locking manner into the region 7a of bowl-like configuration. One or more spray holes 13 are configured in the end side 7c of the region 7a of bowl-like configuration, which spray holes 13 make it possible to inject fluid from the injection valve 1 through the spray holes 13 into an exhaust gas section (not shown in the figures).

The cooling element 38 which comprises the cooling plate 8 which runs around the injection valve 1 and the end plate 7 is connected to the sleeve 3 of the injection valve 1, for example via a circumferential (laser) weld 15. In this way, a closed cooling volume 36 which runs annularly around the sleeve 3 of the injection valve 1 is produced, which cooling volume 36 is delimited by the end plate 7, which forms the bottom of the cooling volume 36, and the sleeve 3 of the injection valve 1 and the cooling plate 8, which together form the inner and outer and upper side wall of the cooling volume 36.

The connecting points 24 and 15 between the end plate 7 and the cooling plate 8 or the end plate 7 and the sleeve 3 of the injection valve 1 are heated to high temperatures by way of the hot exhaust gases in the exhaust gas section during operation of the internal combustion engine. The proposed integrally joined connection, for example by way of (laser) welding, is therefore to be preferred to a connection by way of adhesive bonding or an O-ring seal, since it has considerably higher durability and reliability.

The cooling element 38 is configured with an inlet stub 9a and an outlet stub 9b which are provided to introduce a fluid coolant into the cooling volume 36 and to discharge heated coolant from the cooling volume 36 again. By way of the coolant, the temperature of the injection valve 1 can be kept below a predefined limit value during operation despite high exhaust gas temperatures of the internal combustion engine, in order to prevent overheating of the injection valve 1 and thus to permanently obtain the functionality of the injection valve 1.

The seal between the cooling plate 8 and the injection valve 1 takes place in the first exemplary embodiment which is shown in FIG. 1 by way of a first O-ring 17 which is situated in the cooled region, with the result that it is not subjected to the high exhaust gas temperatures, and which seals a region 21 of the cooling plate 8 which bears against the sleeve 3 of the injection valve 1 radially against the sleeve 3. The curved shape of the region 21 of the cooling plate 8 which bears against the sleeve 3 ensures that the first O-ring 17 at the same time bears against a collar 37 which is configured at the upper end of the sleeve 3 and thus also seals the cooling volume 36 in a fluid-tight manner in the axial direction.

In order to prevent water penetrating from outside into the cooling volume 36, a second O-ring 18 can additionally be provided which seals the contact point between a metal sleeve 2 of the injection valve 1 and the cooling plate 8 in the radial direction. The shape of the cooling plate 8 in the region 20 of the second O-ring 18 at the same time ensures that a rear region 1b of the injection valve 1 which can be configured, in particular, from plastic is sealed in the axial direction against the metal sleeve 2. The O-rings 17 and 18 are mounted before the end plate 7 is connected fixedly to the tip 1a of the injection valve 1, for example by way of (laser) welding.

The cooling element 38 also has a flange 23, via which it is fastened to the exhaust gas section (not shown in FIG. 1).

Figure 3A:
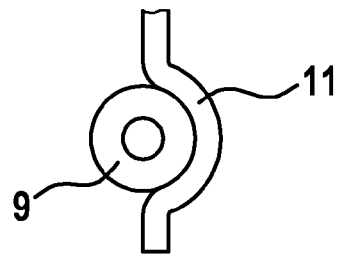
FIGS. 3a and 3b illustrate the fastening of the connector piece to the feed and outlet stubs of the cooling element.
Figure 3B:
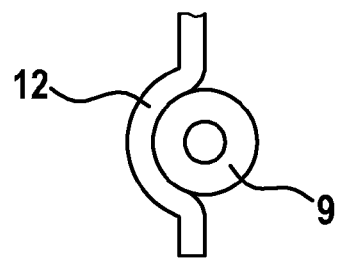

The fluid or reducing agent to be injected is fed to the injection valve 1 via a connector piece 27 which has a fluid feed line 27a. In order to protect the injection valve 1 against the heat of the hot exhaust gases which flow through the exhaust gas section, the connector piece 27 is largely closed off apart from an output (not shown in FIG. 1) for an electric plug which is provided for actuating the injection valve 1. The connector piece 27 is configured, for example, as a sheet metal part. Via two sheet metal brackets 11 and 12, it is attached by way of clipping to the feed and outlet stubs 9a, 9b of the cooling element 38, as illustrated in FIGS. 3a and 3b.

The connector piece 27 is sealed against the injection valve 1 by way of a third O-ring 19 which is preferably arranged in a groove 4 which runs around an upper section of the injection valve 1, with the result that an uncontrolled escape of fluid at the contact point between the injection valve 1 and the connector piece 27 is prevented reliably.

In order to dissipate heat from the connector piece 27, in particular in the region of the third O-ring 19, a contact face 22 is provided between the cooling element 38 and the connector piece 27.

In order that the coolant which immediately adjoins the hot exhaust gas section in the lower region of the cooling volume 36 does not boil during operation, a heat shield 25 is provided in the form of a thin metal disk. Together with the end plate 7, the heat shield 25 which is connected via an undercut 26 to the cooling element 38 encloses an air space 39 which is virtually closed off around the bowl-like region 7a. The air space 39 is cooled by way of the coolant and thus prevents the coolant in the bottom region of the cooling volume 36 being heated to or above its boiling temperature.

Figure 4:
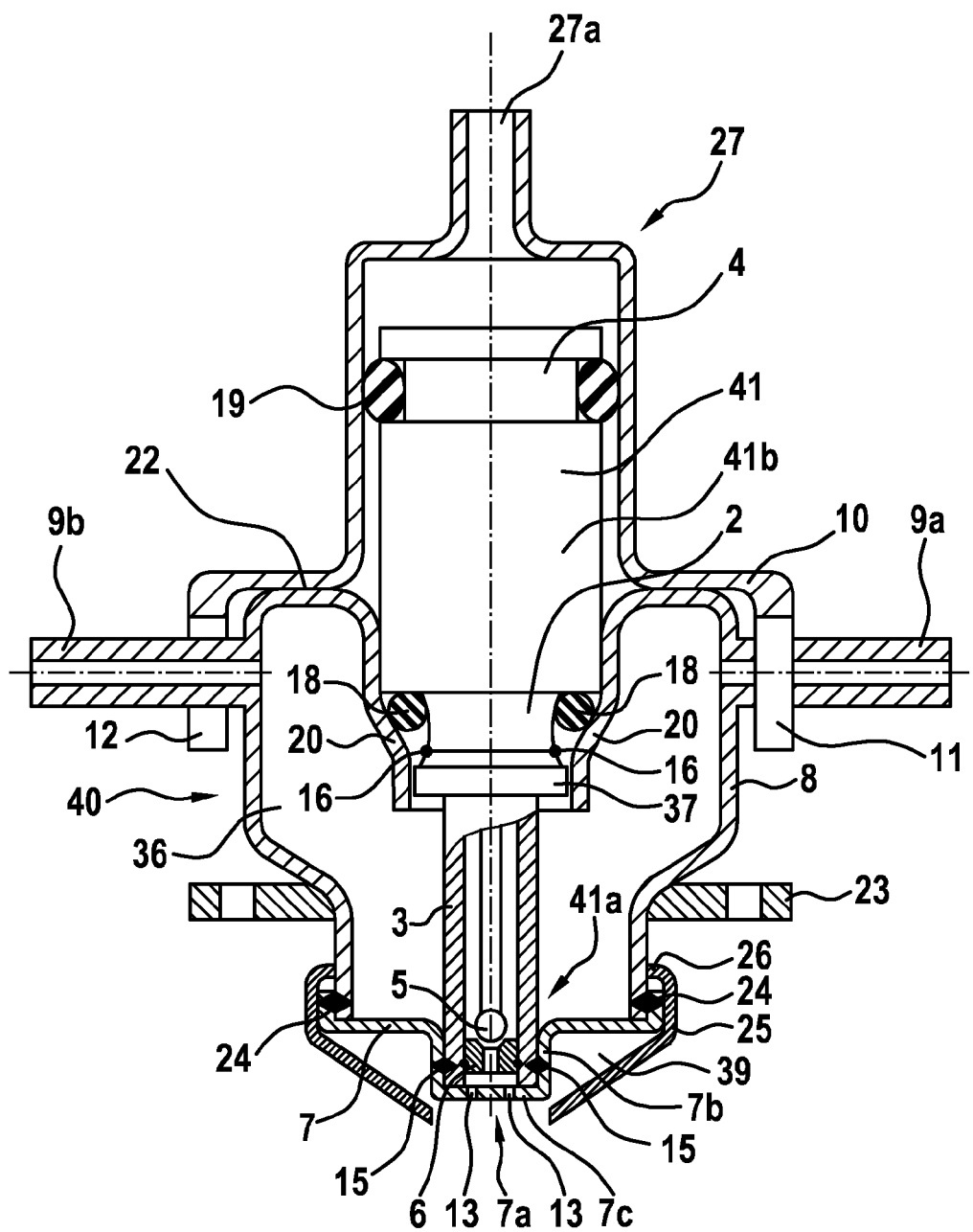
FIG. 4 shows a sectional view of a second exemplary embodiment of a cooling element according to the invention having an injection valve.

FIG. 4 shows a sectional view of a second exemplary embodiment of a cooling element 40 according to the invention having an injection valve 1.

The cooling element 40 according to the second exemplary embodiment which is shown in FIG. 2 corresponds substantially to the first exemplary embodiment which is shown in FIG. 1, and those components which are identical with those of the first exemplary embodiment which is shown in FIG. 1 are provided with the same designations and will not be described in detail again.

In the second exemplary embodiment, an alternative sealing concept in comparison with the first exemplary embodiment is realized: in the second exemplary embodiment, the injection valve 41 has two metal sleeves 2, 3 which are connected to one another in a fluid-tight manner by way of an additional laser weld 16 which runs in the circumferential direction of the metal sleeves 2, 3. The first O-ring 17 which is provided in the first exemplary embodiment, is subjected to relatively high temperatures despite the cooling means which is provided and is therefore susceptible to wear can therefore be dispensed with.

What is claimed is:

1. A cooling element (38; 40) for an injection valve (1; 41), the cooling element comprising:
a hollow region for receiving at least one section (1a, 1b; 41a, 41b) of the injection valve (1; 41);
a cooling plate (8), which runs around the hollow region; and
an end plate (7) which is arranged on an end side of the injection valve (1; 41),
wherein the end plate (7) has at least one region (7a), which is shaped in a bowl-like manner having an end wall (7c) that has at least one injection opening (13) that makes it possible to spray fluid out of the injection valve (1; 41) through the end plate (7),
wherein the end plate (7) further has at least one side wall (7b),
wherein the end plate (7) is configured for receiving an injection-side tip (1a; 41a) of the injection valve (1; 41) in a substantially positively locking manner into the bowl-like region (7a), and
wherein the cooling plate (8) and the end plate (7) are connected to one another in a fluid-tight manner, with the result that, in a state in which a section (1a, 1b; 41a, 41b) of an injection valve (1; 41) is arranged in the hollow region, a cooling volume (36), which runs around the section (1a, 1b; 41a, 41b) of the injection valve (1; 41), is delimited by the end plate (7), the cooling plate (8), and the injection valve (1; 41) such that a coolant in the cooling volume (36) contacts each of the end plate (7), the cooling plate (8), and the injection valve (1; 41).

2. The cooling element (38; 40) as claimed in claim 1, the cooling plate (8) and the end plate (7) being connected to one another in a fluid-tight manner by way of welding.

3. The cooling element (38; 40) as claimed in claim 1, which additionally has a connector piece (27) which is configured for receiving a rear end region (1b; 41b) of the injection valve (1; 41), which rear end region (1b; 41b) lies opposite the injection-side tip (1a; 41a).

4. The cooling element (38; 40) as claimed in claim 3, the connector piece (27) having a feed line (27a) which is configured to feed fluid to be injected to the injection valve (1; 41).

5. The cooling element (38; 40) as claimed in claim 3, at least one feed stub (9a) and one outlet stub (9b) being configured on the cooling plate (8), which feed stub (9a) and outlet stub (9b) makes it possible to conduct cooling fluid into and out of the cooling volume (36), respectively.

6. The cooling element (38; 40) as claimed in claim 5, the connector piece (27) being configured to be mounted on the feed stub (9a) and outlet stub (9b).

7. An injection apparatus having a cooling element (38; 40) as claimed in claim 1 and having an injection valve (1; 41), an injection-side tip (1a; 41a) of the injection valve (1; 41) being arranged in the bowl-like region (7a) of the end plate (7).

8. The injection apparatus as claimed in claim 7, the injection-side tip (1a; 41a) of the injection valve (1; 41) being connected to the bowl-like region (7a) in a fluid-tight manner by way of welding.

9. The injection valve (1) as claimed in claim 7, at least one region (21) of the cooling plate (8) bearing against the injection valve (1), and the cooling volume (36) being sealed in a fluid-tight manner by way of at least one O-ring (17) which is arranged between the injection valve (1) and the region (21) of the cooling plate (8).

10. The injection valve (41) as claimed in claim 7, the injection valve (41) having at least two metal sleeves (2, 3) which are arranged coaxially with respect to one another and are connected to one another in a fluid-tight manner by way of welding.

11. The cooling element (38; 40) as claimed in claim 1, the cooling plate (8) and the end plate (7) being connected to one another in a fluid-tight manner by laser welding.

12. The cooling element (38; 40) as claimed in claim 4, at least one feed stub (9a) and one outlet stub (9b) being configured on the cooling plate (8), which feed stub (9a) and outlet stub (9b) makes it possible to conduct cooling fluid into and out of the cooling volume (36), respectively.

13. The cooling element (38; 40) as claimed in claim 12, the connector piece (27) being configured in such a way that it is configured to be mounted on the feed stub (9a) and outlet stub (9b).

14. An injection apparatus having a cooling element (38; 40) as claimed in claim 1 and having an injection valve (1; 41) which is configured for injecting a fluid reducing agent into an exhaust gas section of an internal combustion engine, an injection-side tip (1a; 41a) of the injection valve (1; 41) being arranged in the bowl-like region (7a) of the end plate (7).

15. The injection apparatus as claimed in claim 14, the injection-side tip (1a; 41a) of the injection valve (1; 41)

being connected to the bowl-like region (7*a*) in a fluid-tight manner by way of laser welding.

16. The injection valve (1) as claimed in claim 14, at least one region (21) of the cooling plate (8) bearing against the injection valve (1), and the cooling volume (36) being sealed in a fluid-tight manner by way of at least one O-ring (17) which is arranged between the injection valve (1) and the region (21) of the cooling plate (8).

17. The injection valve (41) as claimed in claim 14, the injection valve (41) having at least two metal sleeves (2, 3) which are arranged coaxially with respect to one another and are connected to one another in a fluid-tight manner by way of laser welding.

18. The cooling element (38; 40) as claimed in claim 1, at least one feed stub (9*a*) and one outlet stub (9*b*) being configured on the cooling plate (8), which feed stub (9*a*) and outlet stub (9*b*) makes it possible to conduct cooling fluid into and out of the cooling volume (36), respectively.

* * * * *